(12) United States Patent
Chindapol et al.

(10) Patent No.: US 8,203,995 B2
(45) Date of Patent: Jun. 19, 2012

(54) CONNECTION MAINTENANCE IN WIRELESS NETWORK WITH RELAYS VIA CID ENCAPSULATION

(75) Inventors: Aik Chindapol, Washington, DC (US);
Jimmy Chui, Princeton, NJ (US);
Yishen Sun, Libertyville, IL (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 661 days.

(21) Appl. No.: 11/937,143

(22) Filed: Nov. 8, 2007

(65) Prior Publication Data
US 2008/0192673 A1 Aug. 14, 2008

Related U.S. Application Data

(60) Provisional application No. 60/857,538, filed on Nov. 8, 2006, provisional application No. 60/885,930, filed on Jan. 22, 2007.

(51) Int. Cl.
*H04Q 7/00* (2006.01)
*H04Q 7/24* (2006.01)
*H04L 12/28* (2006.01)

(52) U.S. Cl. ........ 370/328; 370/338; 370/389; 370/392; 370/474

(58) Field of Classification Search .................... None
See application file for complete search history.

(56) References Cited

U.S. PATENT DOCUMENTS

| | | | | |
|---|---|---|---|---|
| 5,491,800 | A * | 2/1996 | Goldsmith et al. | 709/221 |
| 7,263,106 | B2 * | 8/2007 | Matthews et al. | 370/466 |
| 7,782,906 | B2 * | 8/2010 | Zhai | 370/474 |
| 2007/0072604 | A1 * | 3/2007 | Wang | 455/428 |
| 2008/0025280 | A1 * | 1/2008 | Hsu et al. | 370/341 |
| 2008/0062904 | A1 * | 3/2008 | Tzu-Ming | 370/312 |
| 2009/0010213 | A1 * | 1/2009 | Yamada et al. | 370/329 |

* cited by examiner

*Primary Examiner* — Jianye Wu
*Assistant Examiner* — Christine Duong

(57) ABSTRACT

A method for transmitting data in a wireless network includes generating a packet of data having a connection identification (CID) indicating a connection to a final destination for the packet of data. A desired path for transmitting the packet of data to the final destination is determined. The desired path includes one or more relay stations. The generated packet of data is encapsulated in one or more capsules, each capsule having a CID indicating a connection to one of the one or more relay stations along the desired path. The packet of data is routed along the desired path using the CIDs of the one or more capsules and the packet of data to arrive at the final destination. At each of the one or more relay station, an outer-most capsule having a CID corresponding to the present relay station is stripped from the packet of data.

19 Claims, 4 Drawing Sheets

CONNECTION MAINTENANCE IN WIRELESS NETWORK WITH RELAYS VIA CID ENCAPSULATION

CROSS-REFERENCE TO RELATED APPLICATION

The present application is based on provisional applications Ser. No. 60/857,538, filed Nov. 8, 2006 and Ser. No. 60/885,930, filed Jan. 22, 2007 the entire contents of which are herein incorporated by reference.

BACKGROUND OF THE INVENTION

1. Technical Field

The present disclosure relates to IEEE 802.16 networks and, more specifically, to connection maintenance in IEEE 802.16 networks with relays via CID encapsulation.

2. Discussion of the Related Art

Wireless communication is an important field of technical development. Wireless communication relates not only to mobile wireless telecommunications networks such as GSM and CDMA cell phone networks, but also to wireless computer networks such as IEEE 802.11 Wifi and IEEE 802.16 Wireless Metropolitan Area Networks (MAN) also known as WIMAX.

Of these networks, WIMAX offers the promise of an effective means of delivering next-generation network access to both general purpose computers and communications appliances without having to build an extensive copper wire or fiberoptic cable infrastructure into homes and offices. Moreover, in addition to providing "last mile" fixed broadband access, WiMAX standards such as IEEE 802.16e provide for network access to mobile terminals that may roam within the coverage area of network base stations.

In such mobile WiMAX networks, a plurality of base stations deliver network access to one or more mobile terminals within their coverage area. As a mobile terminal leaves the coverage area of one base station and enters the coverage area of another base station, network access may be handed off from the one base station to the other base station with little to no disruption of network access.

Accordingly, mobile WiMAX networks may be able to provide network access to mobile terminals for telecommunication and/or arbitrary data transfer such as a connection to the Internet.

To extend the coverage area of a base station and/or to improve signal strength within poorly covered portions of the coverage area, one or more relay stations may be used. A relay station is generally a simple repeater that listens for and rebroadcasts communications signals without regard to the intended destination of the communications signals. Accordingly, a plurality of base stations, each of which may have one or more relay stations within its coverage area, may work together to provide mobile wireless network access across a broad area.

While conventional WiMAX networks employing conventional relay stations may be able to provide network access, there is a continuing need to provide more reliable network access over a greater coverage area while maximizing efficiency of bandwidth.

SUMMARY

A method for transmitting data in a wireless network includes generating a packet of data having a connection identification (CID) indicating a final destination for the packet of data. A desired path for transmitting the packet of data to the final destination is determined. The desired path includes one or more relay stations. The generated packet of data is encapsulated in one or more capsules, each capsule having a CID indicating a unique connection to the one or more relay stations along the desired path. The packet of data is routed along the desired path using the CIDs of the one or more capsules and the packet of data to arrive at the final destination. At each of the one or more relay station, an outer-most capsule having a CID corresponding to the connection to the present relay station is stripped from the packet of data.

The wireless network may conform to one or more IEEE 802.16 standards. The final destination may be a mobile terminal. The desired path may be determined based on measured channel qualities, quality of signals, and/or load balancing. The desired path may be a downlink path and the packet of data may include control data indicating a desired uplink path. The desired path may be both a downlink path and an uplink path. The packet of data may be mutually encapsulated with one or more additional packets of data. The capsules and/or the packet of data may have more than one CID.

A method for relaying wireless data communications in a relay station includes wirelessly receiving a packet of data encapsulated in one or more capsules. Each capsule and the packet of data have a connection identification (CID). An outermost capsule is stripped from the packet of data revealing either another packet of data or the packet of data, thereby revealing a CID. The packet of data is transmitted to a destination indicated by the revealed CID.

The CIDs of the packet of data and the one or more capsules may correspond to a determined path for transmitting the packet of data to a final destination. The final destination may be a mobile terminal. The wireless data communications may conform to one or more IEEE 802.16 standards. The packet of data may be mutually encapsulated with one or more additional packets of data. The capsules and/or the packet of data may have more than one CID.

A method for transmitting data in a wireless network includes determining a desired path for transmitting a packet of data. The desired path includes one or more relay stations. The packet of data is encapsulated in one or more capsules corresponding to the one or more relay stations. The packet of data is transmitted along the desired path.

The wireless network may conform to one or more IEEE 802.16 standards. The packet of data may include a connection identification (CID) indicating a connection to a final destination for the packet of data and each of the one or more capsules has a CID indicating its corresponding relay station. The packet of data may be transmitted along the desired path according to the CIDs. At each relay station, an outer-most capsule having a CID corresponding to the present relay station may be stripped from the packet of data. The desired path may be determined based on measured channel qualities, quality of signals, and/or load balancing.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
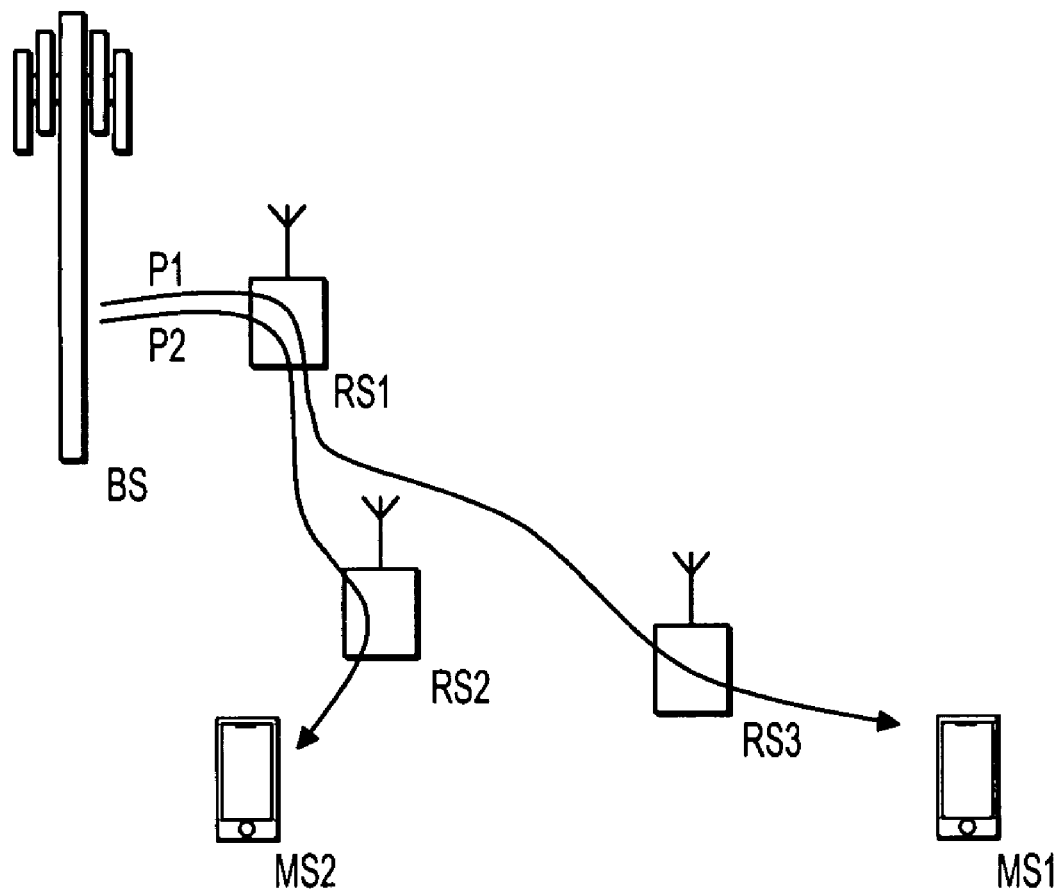
FIG. 1 is a diagram showing a mobile network according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide a method and system for actively routing communication data between a base station (BS) and a mobile station (MS) though one or more relay stations (RS).

In IEEE 802.16e networks, at MS initialization, management connections including basic management connections and primary management connections are established. The basic management connection may be used for short, time-urgent MAC management messages. The primary management connections may be used for longer, more delay tolerant MAC management messages. The transmission of both management information and data may be directed between the BS and the MS using a Connection Identification (CID) number. The CID is a 16-bit number that is used to manage transmissions between the BS and the MS. As data is transmitted solely between the BS and the MS, no routing of data is required.

The CID may be communicated with the data in the form of a DL-MAP that contains information pertaining to the CIDs in each allocated burst of data. By decoding the DL-MAP, the MS may be able to identify which burst it should listen to. Exemplary embodiments of the present invention seek to preserve this functionality to ensure proper interoperability and thus the data arriving at the MS should contain the correct CID for the MS.

In a centralized multi-hop relay system where one or more RSs are located within and/or beyond a BS coverage area, network access may be made more reliable over a greater coverage area while maximizing efficiency of bandwidth when data is actively routed by the BS along a path of one or more RSs to the MS.

However, WiMAX networks, for example, those conforming to the IEEE 802.16e standards, may be addressed by a CID number and thus it may be difficult to actively route data thorough a path of one or more RSs while preserving interoperability with communications systems designed around the IEEE 802.16e standards. Accordingly, exemplary embodiments of the present invention seek to provide active routing of data along a path of one or more RSs.

FIG. 1 is a diagram showing a mobile network according to an exemplary embodiment of the present invention. First data may be routed between a base station (BS) and a first mobile station (MS1) along a first determined path (P1) that includes a first relay station (RS1) and a third relay station (RS3). Meanwhile, second data may be routed between the BS and a second mobile station (MS2) along a second determined path (P2) that includes the RS1 and a second relay station (RS2). By actively routing data along a determined path, data transmission characteristics such as those discussed above may be optimized.

Figure 2:
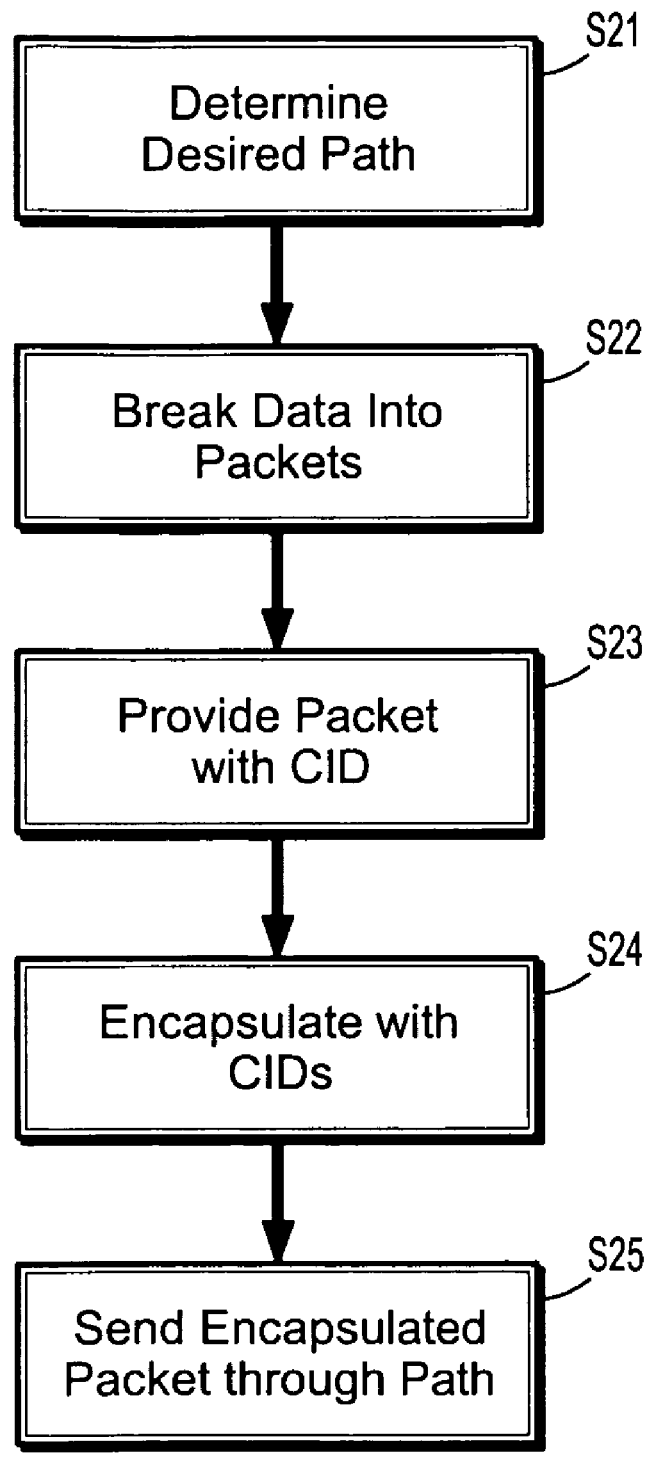
FIG. 2 is a flow chart showing a method for routing communications data between a base station and a mobile station according to an exemplary embodiment of the present invention.

FIG. 2 is a flow chart showing a method for routing communications data between a base station and a mobile station according to an exemplary embodiment of the present invention. First, the base station (BS) determines a desired communications path through which data may be transmitted (Step S21). The desired communications path includes the relay stations that are selected to carry the data and the order in which data is to travel between them on both the downlink, as data moves along the path of selected RSs from the BS to the MS, and the uplink, as data moves along the path of selected RSs from the MS to the BS. The uplink path may be a reverse of the downlink path; however, this need not be the case. The uplink path and the downlink path may be separately determined. Thus in selecting the desired communications path, both the downlink path and the uplink path may be selected.

Selection of the desired path may be determined based on a number of factors. For example, measured channel qualities, quality of signal (QoS) of each connection, load balancing, etc. Factors such as topology of the network and other conditions may quickly change the desirability of various possible paths and thus active path routing allows for the BS to quickly and easily adapt to changing conditions to ensure that reliability and efficiency are optimized.

Moreover, determination of the desired path may incorporate elements discussed in U.S. patent application Ser. No. 11/835,604, filed Aug. 9, 2007, having a common assignee and a common inventor, which is herein incorporated by reference in its entirety.

In the next step, the base station breaks up the data to transmit into packets (Step S22). Each packet of data may then be assigned a CID according to its final destination (Step S23) thus providing interoperability with conventional IEEE 802.16 compliant MSs.

Each packet may then be encapsulated in a series of capsules, each capsule having its own CID identifying a relay station along the determined path (Step S24) such that the inner-most capsule and CID represents the last station along the path from the BS to the MS and the outer-most capsule and CID represents the first station along the path from the BS to the MS.

In encapsulation, the packet for a target recipient is the payload for an intermediary node. There are no requirements for the relationship between the CID of the current packet and the embedded CIDs.

The encapsulated packets of data may then be sent along the desired path (Step S25). At each RS along the path, each RS strips off the outermost capsule and CID thereby revealing the next capsule and CID. The packets then travel to the next RS as specified by the revealed CID where the process continues until the packets are received at the MS. On the uplink, the MS may similarly encapsulate packets of data with the necessary structure to return to the BS along the desired uplink path.

Each relay station may have a particular CID or a range of CIDs that it listens for. The relay stations may be configured to listen for its particular CID and then when a packet with its CID set is found, it may strip away an outer-most header information, process, and forward the remaining payload with the CID indicted for the next hop, which itself may be a packet for the next recipient. The allocation of each transmission is allocated by the BS using a conventional MAP structure.

Figure 3:
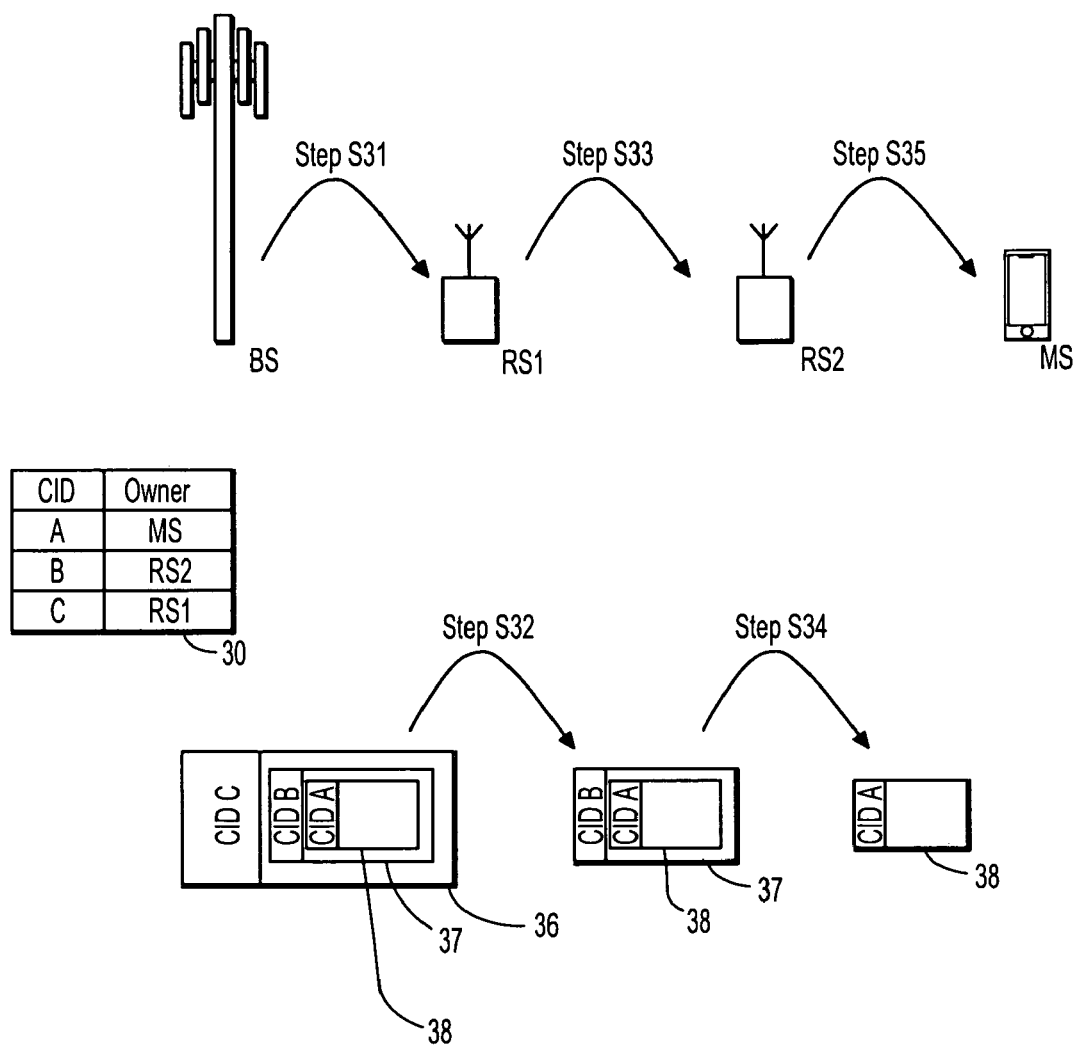
FIG. 3 is a diagram showing packet encapsulation according to an exemplary embodiment of the present invention.

FIG. 3 is a diagram showing packet encapsulation according to an exemplary embodiment of the present invention. As described above, after the BS determines the desired path, each packet of data may be encapsulated in a series of capsules with CIDs designed to deliver the packet from the BS to the MS along the chosen path of RSs. If the chosen path involves multiple intermediate relay stations, the message may be encapsulated multiple times. It may not be necessary to encapsulate the packet for every relay station involved.

In the example shown in FIG. 3, the chosen path includes RS1 and then RS2. The BS may then determine the sequence of CIDs to be used to direct the packet along the selected path. The routing table 30 of FIG. 3 shows the various stations along the determined path and the CIDs that may be used to direct the data along the determined path.

Then the packet may be encapsulated. If a packet is to be transmitted to an MS via an RS, the packet intended for the MS (with CID "A") becomes the payload of a second packet (with CID "B") intended for the RS. When the RS receives the data, it understands to only retransmit the embedded data, i.e. the original packet intended for the MS. The CIDs for the next hop are embedded in the data payload of the current hop. The data may first be encapsulated in a capsule containing "CID A" 38 corresponding to the packet's final destination, here, the MS. The packet is then encapsulated in a capsule containing "CID B" 37 corresponding to the packet's previous location along the selected path, here RS2. The packet is then encapsulated in a capsule containing "CID C" corresponding to the packet's previous location along the selected path, here RS1.

The fully encapsulated data packet may then be sent to the station represented by the CID of the outer-most capsule 36, here RS1 (Step S31). Once at RS1, the packet is stripped of the outermost capsule 36 (Step S32). The packet may then be sent to the station represented by the CID of the new outer-most capsule 37, here, RS2 (Step S33). Once at RS2, the packet is again stripped of the outermost capsule 37 (Step S34). The packet may then be sent to the station represented by the CID of the new outer-most capsule 38, here the MS (Step S35). Accordingly, the encapsulation of the data packets as herein described may route the data packets along the desired path.

On the uplink, the MS may similarly encapsulate packets to be sent to the BS along the desired uplink path. This path may be communicated to the MS from the BS, for example, by the sending of control data from the BS to the MS. Subsequent data packets may be similarly transmitted; however, the desired path may change according to changes in the conditions that factor into the path selection and the changing location of the MS.

Accordingly, as the routing path for a particular MS changes, the desired route may change quickly and easily by encapsulation. Moreover, because packets are routed by encapsulation rather than a tree structure, the location of the RSs need not be fixed. Thus the additional overhead involved with transmitting encapsulated packets provides the ability to quickly redirect packets along a desired path. Thus this approach is particularly suited for the transmission and acknowledgement of management messages and other time-critical applications.

It may not be necessary to have a separate encapsulation for each hop along the selected path. For example, some relay stations may be configured to perform conventional repeating without listening for a particular CID and without stripping their own CID capsule from the packet. A packet routed though such a relay station need not include an encapsulation with a CID for that relay station. Thus, the base station may utilize any combination of conventionally configured relay stations and relay stations configured to act as described above as it routs packets across the desired path. Moreover, the base station may instruct a relay station to act in a particular fashion to meet the needs of the system at the time. Thus a single relay station may be toggled between a conventional mode and a CID stripping mode as herein described.

Additionally, at any level, a capsule with a CID may include more than one sub-capsules, each with its own CID. Similarly, a capsule with a CID may include more than one data packets, each with its own CID. Accordingly, multiple capsules and/or data packets may travel together for as long as their respective paths converge. At the station where their respective paths diverge, the RS may strip away the outermost capsule with its CID to reveal either two distinct capsules or two distinct data packets. At that point, each distinct capsule and/or data packets may continue along its own path.

Figure 4:
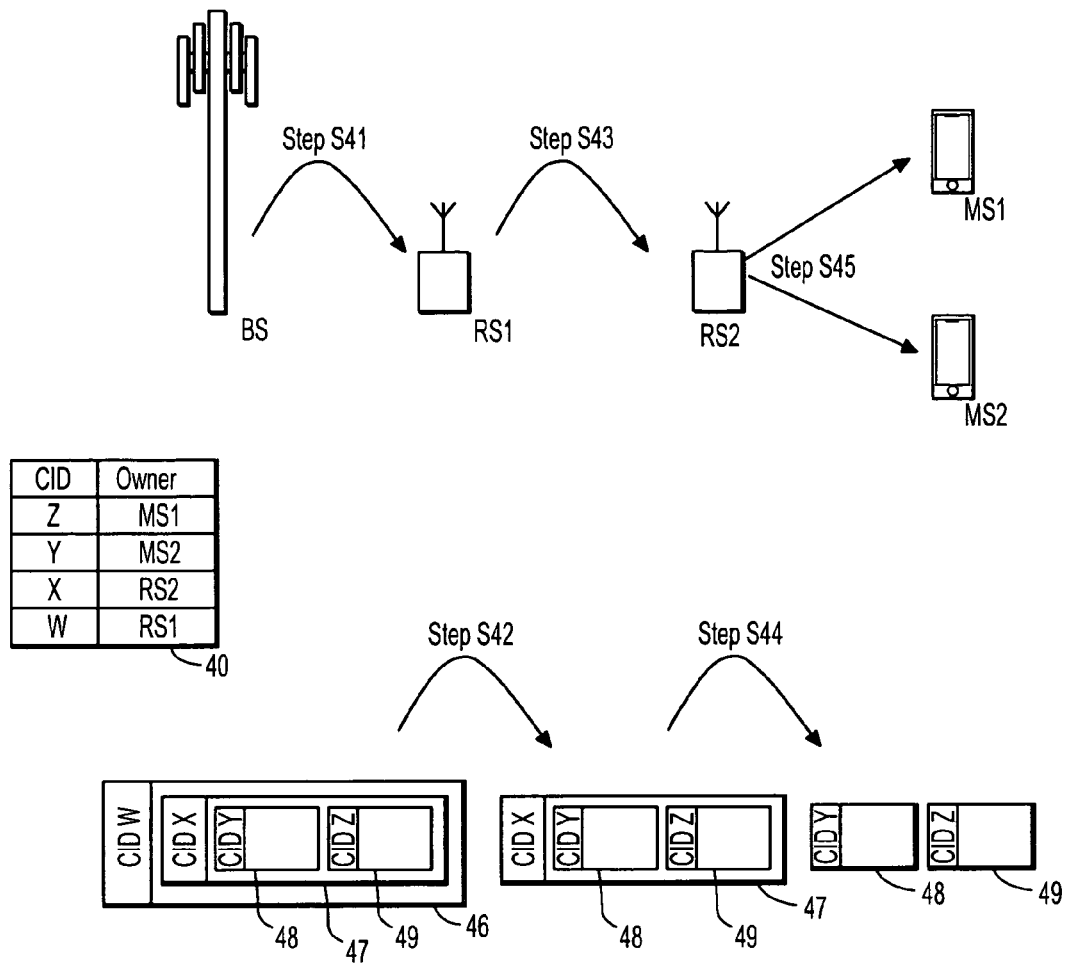
FIG. 4 is a diagram showing multiple packet encapsulation according to an exemplary embodiment of the present invention.

FIG. 4 is a diagram showing multiple packet encapsulation according to an exemplary embodiment of the present invention. In the example of FIG. 4, there are two data packets, a first data packet 49 and a second data packet 48 intended for a first mobile station (MS1) and a second mobile station (MS2), respectively. The selected paths for two data packets are both along RS1 and RS2 so both paths are partially overlapping.

In this example, the two paths are convergent until the final hop, however, divergence may occur at any point along the path depending on the present needs of the system. Because of the shared overhead of mutually encapsulating multiple packets, the base station may be inclined to perform mutual encapsulation wherever possible. Moreover, there is no limit to how many data packets and/or sub-capsules may be mutually encapsulated.

The routing table 40 of FIG. 4 shows the various stations along the determined paths and the CIDs. The first data packet 49 contains "CID Z" and the second data packet 48 contains "CID Y" corresponding to MS1 and MS2 respectively.

Here, the first and second data packets 49 and 48 may be mutually encapsulated into a single capsule 47 containing "CID X" corresponding to RS2. Capsule 47 is encapsulated into a capsule 46 containing "CID W" corresponding to RS1.

Thus, the mutually encapsulated data packets may be sent to the station represented by the CID of the outer-most capsule 46, here RS1 (Step S41). Once at RS1, the packets are stripped of the outermost capsule 46 (Step S42). The packets may then be sent to the station represented by the CID of the new outer-most capsule 47, here RS2 (Step S43). Once at RS2, the packets are again stripped of the outermost capsule 47 (Step S44). The now separated packets 49 and 48 are now each sent to their respective mobile stations MS1 and MS2 (Step S45).

It is also possible to have an embedded packet be sent to more than one destination. This may be performed by incorporating multiple CIDs into a single packet and/or capsule. This may be useful for purposes such as cooperative relays, whereby multiple relay stations obtain the same data and relay the same data in a cooperative manner such as simultaneous transmission via superposition and/or via space-time codes.

Figure 5:
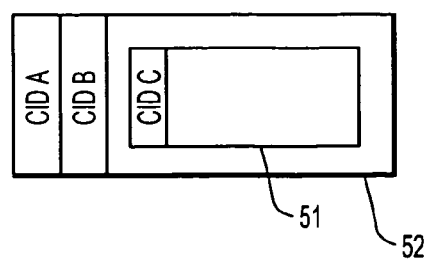
FIG. 5 is an example of an embedded packet directed to multiple destinations according to an exemplary embodiment of the present invention.

FIG. 5 is an example of an embedded packet directed to multiple destinations according to an exemplary embodiment of the present invention. Here, a data packet 51 having a CID "C" is encapsulated within a capsule 52 having two CIDS, CID "A" and "B". Such a capsule may be received by two stations.

Here, each base station, relay station and mobile station may be embodied as a computer system. The base station may include a computer system executing software for performing functions as described herein in connection with a communications network such as a mobile communications network and/or the Internet. The base station may also include a transmission tower with one or more antenna. Each relay station may include a computer system executing software for performing functions as described herein as well as one or more antenna. Each relay station may be stationary and/or mobile. The mobile terminal may be a telephone, smart phone, PDA, portable computer, or the like and may be equipped with a wireless adapter for communicating with the wireless network.

A network conforming to IEEE 802.16 standards has been offered for exemplary purposes. It is to be understood that any mobile network including base stations, relay stations and mobile terminals may utilize the method and systems as herein described.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for transmitting data in a wireless network, comprising:
   generating a packet of data having:
      first header information including a first connection identification (CID); and
      a packet payload,
      wherein the first CID indicates a connection between a base station and a final destination for the packet of data and the packet payload includes the data;
   determining a desired path for transmitting the packet of data to the final destination, wherein the desired path includes at least a first relay station and a second relay station;
   encapsulating the generated packet of data into a first capsule, the first capsule having:
      second header information including a second CID indicating a connection to the first relay station; and
      a first capsule payload, the first capsule payload including the packet of data which includes the first CID and the data,
      wherein the first CID is not included in the second header information;
   encapsulating the first capsule into a second capsule, the second capsule having:
      third header information including a third CID indicating a connection to the second relay station; and
      a second capsule payload, the second capsule payload including:
         the first capsule including the second header information with the second CID, and
         the first capsule payload, the first capsule payload including the packet of data which includes:
            the first header information including the first CID; and
            the data,
         wherein the first CID and the second CID are not included in the third header information;
   routing the second capsule from the base station or a third relay station to the second relay station using the third CID;
   stripping the second capsule from the first capsule at the second relay station;
   routing the first capsule from the second relay station to the first relay station using the second CID;
   stripping the first capsule from the packet of data at the first relay station; and
   routing the packet of data from the first relay station to the final destination using the first CID.

2. The method of claim 1, wherein the wireless network conforms to one or more IEEE 802.16 standards.

3. The method of claim 1, wherein the final destination is a mobile terminal.

4. The method of claim 1, wherein the desired path is determined based on one or more of: measured channel qualities, quality of signals, or load balancing.

5. The method of claim 1, wherein the desired path is a downlink path and the packet of data includes control data indicating a desired uplink path.

6. The method of claim 1, wherein the desired path is both a downlink path and an uplink path.

7. The method of claim 1, wherein the packet of data is mutually encapsulated into the first capsule with one or more additional packets of data for a total of at least two packets of data encapsulated into the first capsule.

8. The method of claim 1, wherein one or more of the capsules and the packet of data have more than one CID.

9. A method for relaying wireless data communications in a first relay station, comprising:
   wirelessly receiving a first capsule, the first capsule having:
      first header information including a first connection identification (CID), the first CID indicating a connection to the first relay station; and
      a first capsule payload, the first capsule payload including:
         a second capsule, the second capsule having:
            second header information including a second CID, the second CID indicating a connection to a second relay station, wherein the second CID is not included in the first header information; and
            a second capsule payload, the second capsule payload having a packet of data, the packet of data including:
               third header information including a third CID, the third CID indicating a connection to a final destination, wherein the third CID is not included in either of the second header information and the first header information; and
               a packet payload;
   stripping the first capsule from the second capsule revealing the second capsule including:
      the first header information including the second CID; and
      the second capsule payload, the second capsule payload having:
         the packet of data including:
            the third header information including the third CID; and
            the packet payload; and
   transmitting the second capsule to the second relay station indicated by second CID included in the revealed second header information.

10. The method of claim 9, wherein the CIDs of the packet of data and the first and second capsules correspond to a determined path for transmitting the packet of data to the final destination.

11. The method of claim 10, wherein the final destination is a mobile terminal.

12. The method of claim 9, wherein the wireless data communications conform to one or more IEEE 802.16 standards.

13. The method of claim 9, wherein the packet of data is mutually encapsulated into the second capsule with one or more additional packets of data for a total of at least two packets of data encapsulated into the second capsule.

14. The method of claim 9, wherein one or more of the capsules and the packet of data have more than one CID.

15. A method for transmitting data in a wireless network, comprising:
   determining a desired path for transmitting a first packet of data, wherein the desired path includes at least a first relay station, a second relay station, and a first mobile terminal, and the first packet of data includes first header information including a first connection identification (CID), the first CID indicating a connection between a base station and the first mobile terminal;
   determining a desired path for transmitting a second packet of data, wherein the desired path includes at least the first relay station, the second relay station, and a second mobile terminal, and the second packet of data includes second header information including a second CID, the second CID indicating a connection between the base station and the second mobile terminal;
   encapsulating the first and second packets of data into a first capsule, the first capsule including:
      third header information including a third CID, the third CID indicating a connection to the first relay station; and
      a first capsule payload, the first capsule payload including the first packet of data and the second packet of data, wherein the first CID and the second CID are not included in the third header information;
   encapsulating the first capsule into a second capsule, the second capsule including:
      fourth header information including a fourth CID, the fourth CID indicating a connection to the second relay station; and
      a second capsule payload, the second capsule payload including the first capsule, wherein the first CID, the second CID and the third CID are not included in the fourth header information; and
   transmitting the second capsule to the second relay station based on the fourth CID.

16. The method of claim 15, wherein the wireless network conforms to one or more IEEE 802.16 standards.

17. The method of claim 15, wherein the packet of data is transmitted along the desired path based on the CID of an outer-most capsule.

18. The method of claim 15, wherein at each relay station, an outer-most capsule having a CID corresponding to a connection to the present relay station is stripped from the packet of data.

19. The method of claim 15, wherein the desired path is determined based on one or more of: measured channel qualities, quality of signals, or load balancing.

* * * * *

UNITED STATES PATENT AND TRADEMARK OFFICE
CERTIFICATE OF CORRECTION

| | | |
|---|---|---|
| PATENT NO. | : 8,203,995 B2 | Page 1 of 1 |
| APPLICATION NO. | : 11/937143 | |
| DATED | : June 19, 2012 | |
| INVENTOR(S) | : Aik Chindapol et al. | |

It is certified that error appears in the above-identified patent and that said Letters Patent is hereby corrected as shown below:

In column 8, line 66, in claim 9, after "indicated by" insert -- the --.

Signed and Sealed this
Eleventh Day of September, 2012

David J. Kappos
*Director of the United States Patent and Trademark Office*